(12) United States Patent
Verkama

(10) Patent No.: US 6,351,641 B2
(45) Date of Patent: *Feb. 26, 2002

(54) PAGING OF MOBILE STATION IN A CELLULAR RADIO SYSTEM

(75) Inventor: Markku Verkama, Espoo (FI)

(73) Assignee: Nokia Telecommunications Oy, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/360,048

(22) Filed: Jul. 23, 1999

Related U.S. Application Data (63) Continuation of application No. PCT/FI98/00101, filed on Feb. 3, 1998.

(30) Foreign Application Priority Data

Feb. 7, 1997 (FI) .................................................. 970555

(51) Int. Cl.[7] ................................................ H04Q 7/20
(52) U.S. Cl. ........................ 455/426; 455/458; 455/456
(58) Field of Search ................................ 455/426, 458, 455/456; 340/311.1, 313, 825.54, 7.2, 7.21

(56) References Cited

U.S. PATENT DOCUMENTS

| | | | |
|---|---|---|---|
| 5,345,500 A | * 9/1994 | Breeden et al. | 455/458 |
| 5,369,681 A | 11/1994 | Boudreau et al. | 455/456 |
| 5,506,886 A | * 4/1996 | Maine et al. | 455/31.3 |
| 5,533,094 A | 7/1996 | Sanmugam | 455/426 |
| 5,594,776 A | 1/1997 | Dent | 455/458 |
| 5,826,173 A | * 10/1998 | Dent | 455/38.3 |
| 5,875,400 A | * 2/1999 | Madhavapeddy et al. | 455/458 |
| 5,960,356 A | * 9/1999 | Alperovich et al. | 455/458 |
| 6,035,203 A | * 3/2000 | Hanson | 455/458 |

FOREIGN PATENT DOCUMENTS

| | | |
|---|---|---|
| EP | 0732862 | 9/1996 |
| WO | WO 95/28063 | 10/1995 |
| WO | WO 9748244 | 12/1997 |

OTHER PUBLICATIONS

Jan. 9, 1998 International Search Report for PCT/FI98/00101.

1992 "The GSM System for Mobile Communications" Mouly, et al. pp. 7–9.

1995 "Adaptive Paging Alogorithms for Cellular Systems" Madhavapeddy, et al. Workshop Record, Fifth Winlab Workshop on Third Generation Wireless Information Networks.

* cited by examiner

Primary Examiner—Nay Maung
Assistant Examiner—Erika A. Gary
(74) Attorney, Agent, or Firm—Altera Law Group (57) ABSTRACT

In cellular radio systems re-paging of a mobile station (MS) loads the mobile communications network very much, especially the limited radio path resources of the network. The present invention concerns a paging method in a cellular radio system including several cells (C1–C10). In the method a first paging of the mobile station (MS) is performed in all cells (C1–C10) of the area according to the stored location information. According to the invention, the paging method is characterized in that in the method the area according to the location information is divided according to the cell division into at least two sub-areas, each one of which is formed of at least one cell, limitation values for the number of pagings are defined for the cells on a sub-area basis and re-paging of the mobile station is limited in each cell of the area based on the said limitation values for the number of pagings.

13 Claims, 4 Drawing Sheets

PAGING OF MOBILE STATION IN A CELLULAR RADIO SYSTEM

This application is a continuation of Ser. No. PCT/FI98/00101 filed Feb. 3, 1998.

FIELD OF APPLICATION OF THE INVENTION

The invention concerns a method of paging in a cellular radio system including several cells, mobile stations and a database wherein location information of the mobile station is stored. In the method a first paging of the mobile station is performed in all cells of an area according to the stored location information.

In addition, the invention concerns an arrangement in a cellular radio system.

BACKGROUND OF THE INVENTION

Figure 1:
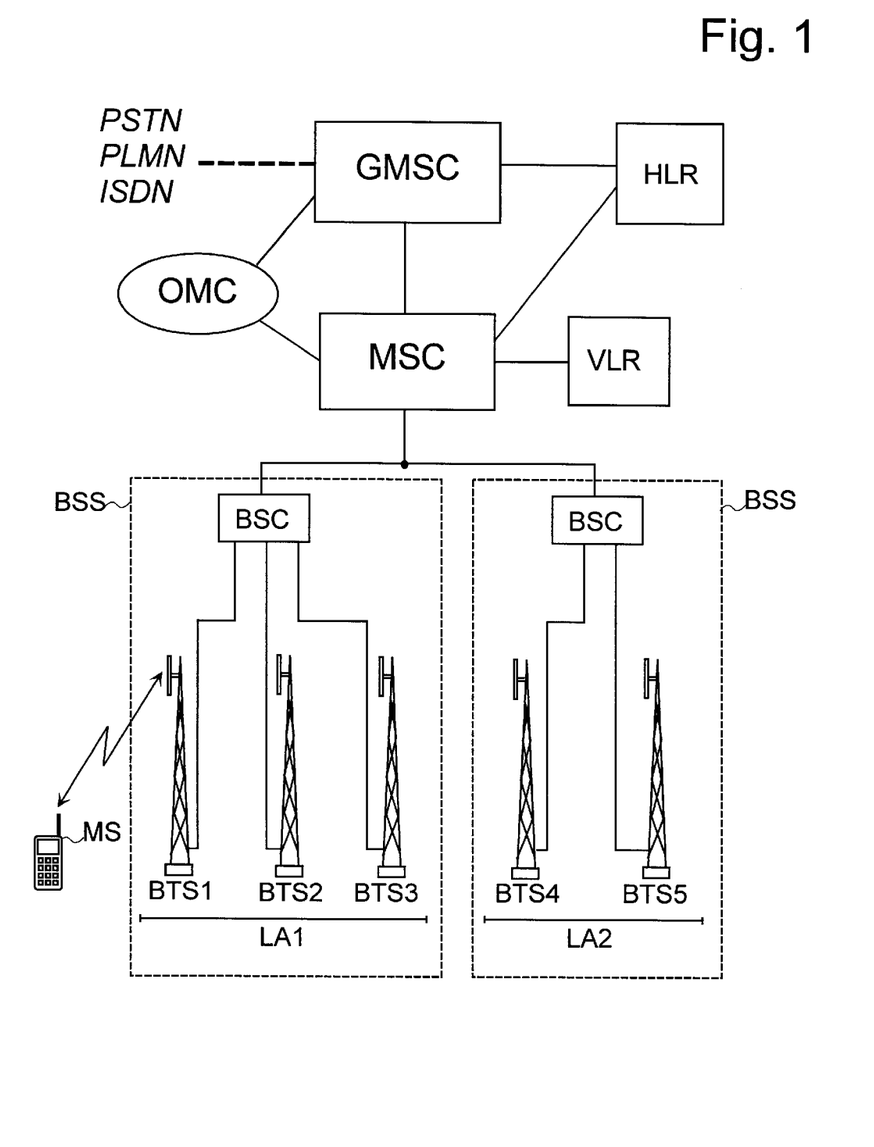
FIG. 1 shows a block diagram of the structure of a mobile communications system.

FIG. 1 in the appended drawing shows a block diagram of a simplified GSM mobile communications system. The Mobile Station MS is connected over the radio path with some Base Transceiver Station BTS, which is BTS1 in the example shown in FIG. 1. The Base Station System BSS comprises a Base Station Controller BSC and subordinated base transceiver stations BTS. Several Base Station Controllers BSC are usually subordinated to a Mobile Services Switching Centre MSC. The mobile services switching centre MSC is connected to other mobile services switching centres and through a Gateway Mobile Services Switching Centre GMSC the GSM network is connected to other networks, such as a public telephone network PSTN, another public land mobile network PLMN or an ISDN network. The operation of the whole system is monitored by an Operation and Maintenance Centre OMC. Subscriber information of the mobile station MS is stored permanently in the Home Location Register HLR and temporarily in that Visitor Location Register VLR in the area in which the mobile station MS is located at each time. The location information of the mobile station MS is stored in the visitor location register VLR with the accuracy of a Location Area LA.

The geographical area monitored by the visitor location register VLR is divided into one or more location areas LA, inside each of which the MS may move freely without notifying the VLR. One or more base transceiver stations BTS may operate within each location area. The base transceiver stations BTS send constant information about themselves and about their environment on their broadcast channel, such as a Base Station Identity Code BSIC, adjacent cell information and a Location Area Identifier LAI. Based on the last-mentioned, the MS which has locked into the base transceiver station BTS will know in which location area LA it is located at each time. If when changing base transceiver station BTS the mobile station notices that the location area identifier LAI of the base transceiver station has changed, the mobile station will send a location update request to the network. The location area of the mobile station MS will be updated in that visitor location register VLR, in the area of which the mobile station is located at each time. Information indicating in which VLR's area the MS is located is relayed to the home location register HLR.

The mobile station's location information stored in registers of the mobile communications system is used e.g. in routing of an incoming call. Based on location information of the mobile station MS available from the home location register HLR and from the visitor location register VLR, the incoming call is routed to that mobile services switching centre MSC in the area of which the mobile station MS of the called subscriber is located at each time according to the location information. The mobile services switching centre MSC asks its own visitor location register VLR for information on the called subscriber for setting up the call. The visitor location register VLR gives the required information on the mobile station MS including e.g. the mobile station's MS location area LA stored in the latest location update, which is LA1 in the case shown in FIG. 1. Based on the location area information, the mobile services switching centre MSC will send a paging message provided with the mobile station's MS identifier on the paging channels of all base transceiver stations of the location area in question, in the case shown in FIG. 1 on the paging channels of base transceiver stations BTS1, BTS2 and BTS3. Mobile stations MS located in the coverage area of base transceiver station BTS regularly receive the signal on Paging Channel PCH of the cell's base transceiver station and they reply to the received paging on Random Access Channel RACH of that BTS, in the coverage area of which the mobile station MS is located when receiving, e.g. on the RACH channel of base transceiver station BTS1 in FIG. 1. On receiving the reply, the network reserves a traffic channel for the call and sets up a speech connection for mobile station MS.

When base transceiver stations BTS send a paging message, the mobile station MS may be momentarily in a shadow region of the network, e.g. in a tunnel, or mobile station MS does not receive the paging message correctly, e.g. due to interference or noise. The paging message will hereby not reach the called subscriber, even if the subscriber would otherwise be prepared to receive the call. Paging will also fail, if the mobile station MS is turned off unbeknownst to the mobile communications network or if the transmission power of mobile station MS is not sufficient for setting up a connection with the base transceiver station. If the mobile station does not reply to paging, e.g. within a certain period of time, it is generally known to perform re-paging of the mobile station MS over the entire location area LA through all base transceiver stations BTS in the location area. Typically, such re-paging is done no more than two or three times.

The publication "Adaptive Paging Algorithms for Cellular Systems", S. Madhavapeddy et al., Fifth WINLAB Workshop on Third Generation Wireless Information Networks, 1995, pages 347–361, presents the establishment and utilisation of a paging area based on statistics kept on the mobile station's location. In the method according to the publication, paging of the mobile station is first done in the formed paging area, where the mobile station is expected to be located most probably. If the mobile station does not reply to the first paging, a new extended paging is performed, either once more in the same paging area or through all base transceiver stations in the location area. In another embodiment presented in the publication, paging of the mobile station is first done in the established paging area and next through all base transceiver stations of the system, if the mobile station does not reply to the first paging. If the mobile station does not reply even to the second paging, a third paging will be sent through those base transceiver stations which are not located within the established paging area.

It is a problem with known re-paging methods that due to the large paging area they load the network extensively, especially the limited resources of the radio path, and will cause plenty of signalling loads both on the radio path and between the radio network's switching centre and base transceiver stations. Nor do known paging methods take into account that shadow areas of cells are of different size, whereby the need for re-paging will vary in cells. In addition, when the mobile station is turned off or if the transmission power of the mobile station is too low, re-paging will not be successful, whereby network resources have been spent on extended paging quite unnecessarily.

BRIEF DESCRIPTION OF THE INVENTION

It is a purpose of this invention to implement optimum paging of a mobile station in a cellular radio system. In other words, the objective is paging of the mobile station with as few paging messages as possible, however, maintaining a good standard of service.

This new type of mobile station paging is achieved in the method according to the invention, which is characterised in that in the method the area according to the location information is divided according to the cell division into at least two sub-areas, each one of which is made up of at least one cell, limitation values for the number of pagings are defined on a sub-area basis for the cells and re-paging of the mobile station is performed so that the number of re-pagings to be performed in each area according to the location information is limited based on the said limitation values for the number of pagings.

The invention also concerns an arrangement in a cellular radio system comprising several cells, mobile stations and a database, wherein the mobile station's location information is stored. According to the invention, the arrangement is characterised in that it comprises storing means for storing limitation values for the number of pagings in the cells and means for limiting re-pagings to be performed based on the said limitation values for the number of pagings.

The invention is based on the idea that re-paging of a mobile station is performed within an area which is smaller than the normal location area and wherein re-paging based on information collected from the network is most likely to be successful. Limitation values for the number of allowed pagings to be performed are defined separately for each cell or group of cells. Based on these limitation values, such cells are selected for each re-paging round wherein re-paging may still be performed. Re-paging is performed so many times in each cell as is indicated by the limitation value defined for the number of pagings for the cell, unless re-paging is found unnecessary e.g. if the mobile station has already replied to a sent paging message.

It is an advantage of such a paging method that it minimises network loading and, in particular, the use of radio resources in re-paging.

Another advantage of the paging method according to the invention is that re-paging may be targeted e.g. only at shadow areas of the network's radio coverage or at poor signal areas of the network.

It is another advantage of the paging method according to the invention that in a radio network of a good quality, re-paging which is probably unnecessary is avoided, whereby information on failed paging can be forwarded more quickly, e.g. to subscriber A, or the call can be connected more quickly to the voice mail of the called subscriber.

LIST OF FIGURES

The invention will be described in greater detail in the following in connection with advantageous embodiments and referring to the appended drawings, wherein.

DETAILED DESCRIPTION OF THE INVENTION

The present invention may be applied in connection with any mobile communications system of the cellular type. The system is described hereinafter by way of example primarily in connection with a GSM mobile communications system. FIG. 1 shows the simplified structure of the GSM network which was mentioned earlier. The GSM system is described in GSM recommendations and the book "The GSM System for Mobile Communications", M. Mouly & M. Pautet, Palaiseau, France, 1992, ISBN:2-9507190-0-7, where an interested reader can find more background information.

Figure 2:
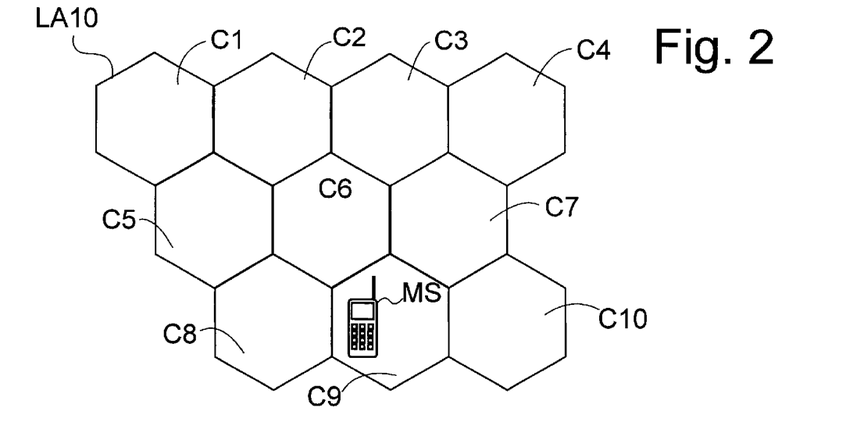
FIG. 2 shows an example of the cellular structure of a radio network.

FIG. 2 shows a simplified example of a cellular structure, where the geographic area of the network shown in the figure is divided into cells C1–C10 so that when located in each cell the mobile station MS is in connection with the network through a base transceiver station BTS1–10 (not shown in the figure) located in the cell. Cells C1–C10 establish one location area LA10 in the network.

The invention is described more closely in the following in the light of a primary embodiment of the invention and referring to FIG. 2. According to the present invention, a limitation value Ri is determined for the number of pagings for each cell in the network, e.g. based on the success of earlier pagings performed in the cell, as will be described later in this application, or based on the occurrence of shadows in cell coverages. The limitation values Ri for the number of pagings established by the operator are stored in connection with a unit controlling the paging process of the mobile communications system, e.g. a mobile services switching centre MSC or base station controllers BSC. In the example shown in FIG. 2, limitation values R1–R10 for the number of pagings in cells C1–C10 are stored as follows: R1, . . . , R8=1, R9=2 and R10=3, whereby in cells C1–C8 only one paging is allowed, in cells C9 after the first paging one re-paging and in cell C10 no more than three pagings.

When the location area LA10 has been stored in the subscriber information of visitor location register VLR as the mobile station's MS location information and when paging for mobile station MS, state-of-the-art paging is first performed in all cells C1–C10 of the location area LA10, that is, a paging message provided with the mobile station's MS identifier is sent on the paging channels of base transceiver stations BTS1–10. According to the state of the art, the mobile station identifier used in the paging message may be a Temporary Mobile Subscriber Identity TMSI or an International Mobile Subscriber Identity IMSI. If the mobile station MS does not reply to this first paging within a certain period of time through any base transceiver station BTS1–10 which has sent the paging message, those cells wherein re-paging will be performed are chosen from the cells C1–C10 of location area LA10 according to the primary embodiment of the invention. This second paging is performed in those cells, which have a limitation value R1 of at least two. In the case of the example shown in FIG. 2, such cells are C9 and C10. The unit or units in control of the paging process will relay to base transceiver stations BTS9 and BTS10 a command to perform re-paging. A paging message provided with the identifier of mobile station MS is thus sent once more on the paging channels of base transceiver stations BTS9 and BTS10. Again according to the state of the art, the mobile station identifier used in the paging message may be either TMSI or IMSI. The identifier used in re-paging may be a different one than the identifier used in the first paging. If the mobile station MS now replies to this paging, e.g. through base transceiver station BTS9, the paging process will be stopped and a state-of-the-art call setup will be performed. If the mobile station MS would not have replied even to the second paging, paging for the mobile station MS would have been performed a third time in cell C10. The mobile station identifier used in the paging message may again be either TMSI or IMSI irrespective of the identifiers used in the previous pagings. Paging would be deemed unsuccessful if the mobile station MS would not have replied to the paging message even after the third paging.

Figure 3:
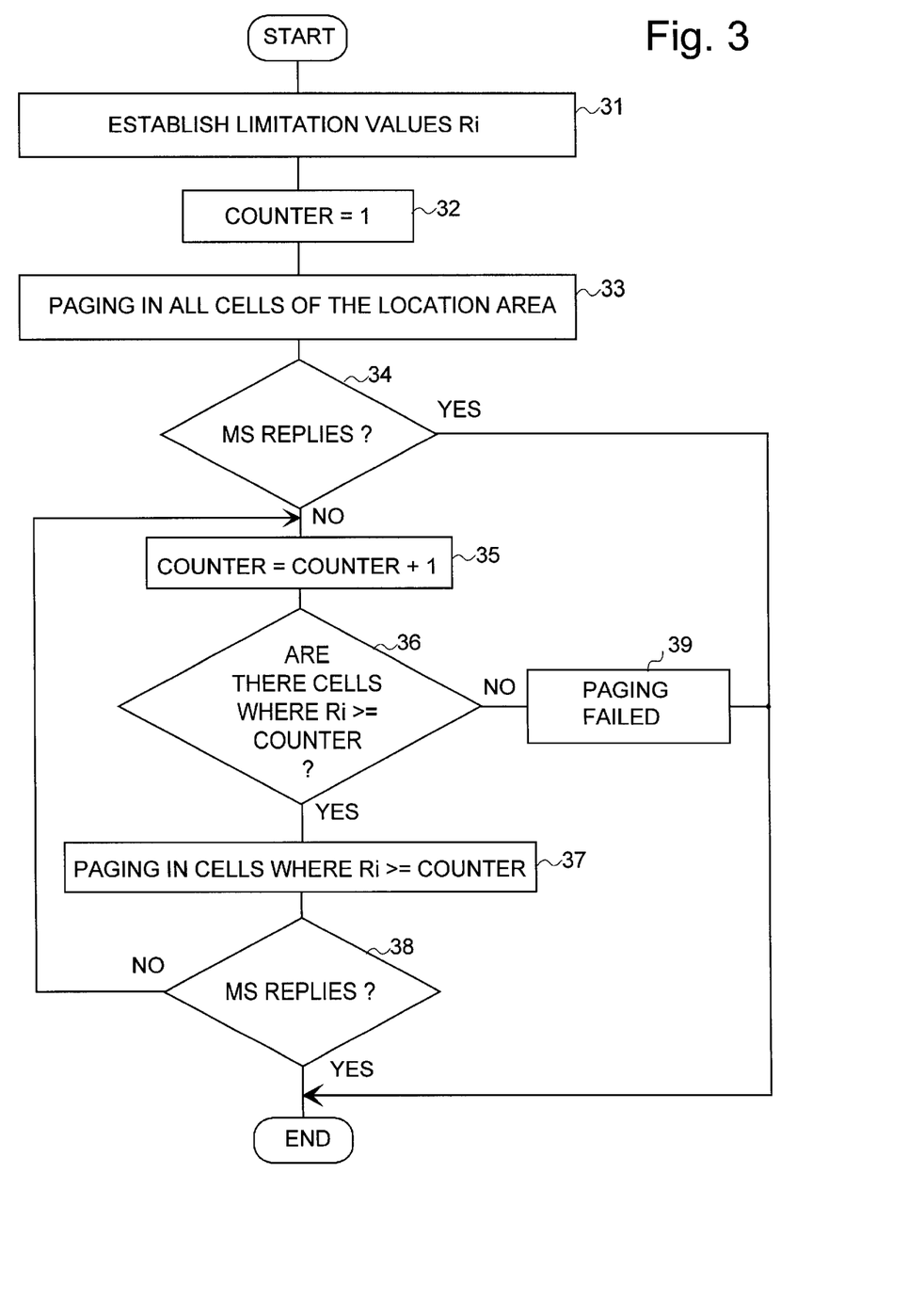
FIG. 3 shows a flow chart of the paging method according to a primary embodiment of the invention.

FIG. 3 shows a flow chart of a primary embodiment of the paging method according to the invention. At point 31 the operator establishes limiting values Ri for the number of pagings separately for either each cell or each cell group. Establishment of the values Ri is performed at least once when the method is introduced, whereupon the values Ri need not necessarily be re-established. The limitation value Ri for the number of pagings is established for all those cells, where it is desired to bring about a functionality according to the invention. At point 32 in FIG. 3, the value established for the counter is 1. Here the value of the counter indicates which paging in succession is about to begin. According to the state of the art, paging of mobile station MS is performed at point 33 in all cells of the location area indicated by the location information, in the case shown in FIG. 2 in cells C1–C10 of location area LA10. At point 34 in FIG. 3, the unit controlling the paging process in the mobile communications system, e.g. the mobile services switching centre MSC, will wait for a reply from mobile station MS for a certain time. If mobile station MS does not reply to the first paging message sent in the whole location area, the counter value will be raised by one at point 35 in FIG. 3 in accordance with the present invention. At point 36 the limitation values Ri established for the number of pagings are compared to the counter value, which according to the above presentation is 2 after the first paging, and a check is made to find out if any limitation value Ri for the number of pagings is at least equal to the counter value. If even one such cell is found which meets the condition of point 36, re-paging will be performed at point 37 in those cells which have a limitation value Ri for the number of pagings which is at least equal to the counter value. In the case shown in FIG. 2, this second paging according to point 37 is performed in cells C9 and C10, which have limitation values R9=2 and R10=3 which are at least equal to the counter value of 2. When the mobile services switching centre MSC controls the paging process, it sends to the base station controllers BSC, in the case of GSM information in a BSSMAP_PAGING message indicating in which base transceiver stations paging must be performed. If those base transceiver stations BTS where re-paging is to be performed are located subordinated to several different base station controllers BSC, then the mobile services switching centre MSC will send to each base station controller BSC an individual BSSMAP_PAGING message, indicating the re-pagings to be performed under the base station controller BSC in question. In the case shown in FIG. 2, the base station controller BSC forwards to base transceiver stations BTS9 and BTS10 a command to send a paging message to the mobile station MS. At point 38 in FIG. 3 the process again waits to see if mobile station MS will within a certain time respond after the paging message was sent. If the mobile station does not reply even now, the process returns to point 35 in FIG. 3 once again to raise the counter value by one. The next step is the check at point 36 as was described above. If such cells are still found which meet the condition of point 36, that is, which allow re-paging, then re-paging at point 37 is performed in those cells, in the case of FIG. 2 the third paging would be performed in cell C10, whose R10=3 is at least equal to the counter value of 3. Re-pagings are continued in the cells allowing re-paging until mobile station MS responds or until no more such cells are found which allow re-paging. If it is found as a result of the check at point 36 in FIG. 3 that the limitation value Ri of all cells Ci are below the counter value, then paging for mobile station MS is discontinued and the paging is deemed a failure (point 39). Any continued processing of a failed paging is performed as state-of-the-art processing. E.g. subscriber A may be informed that the called subscriber can not be reached or the call may be directed to the voice mail of the called subscriber.

The functionality controlling the paging process of the primary embodiment of the present invention is preferably located in the mobile services switching centre MSC. If the functionality according to the primary embodiment of the invention is located in base station controller BSC, then the base station controller BSC must be adapted to identify the mobile station's MS reply to the paging message, so that the paging process may be interrupted after the mobile station has replied. If in this case base transceiver stations BTS in cells of some location area are in addition controlled by more than one base station controller BSC, it is advantageous to arrange between these base station controllers BSC a signalling connection and to adapt the base station controllers to identify such signalling, which may be used for informing other base station controllers performing paging of the same mobile station MS that the mobile station MS has replied to the paging message through a base transceiver station subordinated to some base station controller.

Figure 4:
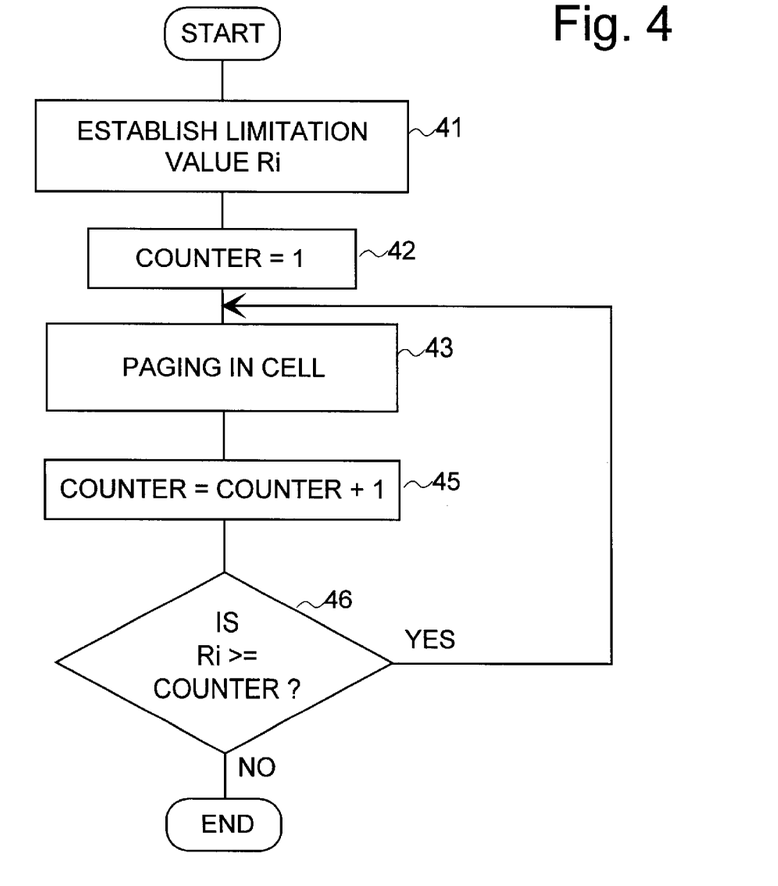
FIG. 4 shows a flow chart of the paging method according to a secondary embodiment of the invention.

FIG. 4 shows a flow chart of a secondary embodiment of the paging method according to the invention. In the secondary embodiment of the invention control of the re-paging process preferably takes place at base transceiver station BTS, which does not wait for any reply from mobile station MS, but completes the whole paging process in the cell whether the mobile replies or not. At point 41 in FIG. 4 the operator establishes a limitation value Ri for the number of pagings in the cell of base transceiver station BTS in the same way as described above in connection with the primary embodiment. At point 42 a value of 1 is established for the counter counting the number of pagings to be started. At point 43 state-of-the-art paging of mobile station MS is performed in the cell for the first time. At point 45 in FIG. 4 the value of the counter is increased by one in accordance with the present invention. At point 46 the established limitation value Ri is compared with the counter value, which according to the above presentation is 2 after the first paging, and a check is made to find out whether the limitation value Ri is at least equal to the counter value. When the condition at point 46 is fulfilled, the process goes on to point 43 to perform a new paging in the cell, whereupon the counter value is again increased at point 45. Re-pagings are continued until the condition of the check at point 46 in FIG. 4 is no longer fulfilled, whereby paging is regarded as completed. Further processing of a successful and an unsuccessful paging is performed in a state-of-the-art manner.

In the secondary embodiment of the invention signalling load between base station controller and base transceiver station BTS is minimised, since for one paging round to be started the base station controller BSC sends to base transceiver station BTS only one paging command and base transceiver station BTS performs re-pagings independently.

The paging process of the secondary embodiment of the invention is generally completed in such a way that the number of pagings allowed by the limitation value Ri for the number of pagings in each cell is performed in all cells. Depending on the load situation of the individual base transceiver station BTS, re-pagings according to the invention may also be left unperformed at some base transceiver station, if there is too much of other call loading at the base transceiver station BTS. In this way re-pagings according to the invention are prevented from blocking the paging channel.

If required, the primary and secondary embodiments described above may also be combined e.g. so that re-paging of mobile station MS is performed independently at base transceiver station BTS according to the limitation value R1i established for the number of pagings at the base transceiver station whereas at the mobile services switching centre MSC sending of re-paging commands is performed at a slower rate to the mobile services switching centre MSC according to the limitation value R2i for the number of pagings in the cell of base transceiver station BTS. In this combined embodiment, base transceiver station BTS thus performs its own re-paging round independently for each paging command sent by mobile services switching centre MSC, whereby more paging messages pass across the radio interface than is expressed by the individual limitation values for the number of pagings. Thus, re-pagings to be performed in the process of paging mobile station MS can be limited according to more than one limitation value Ri.

Figure 5:
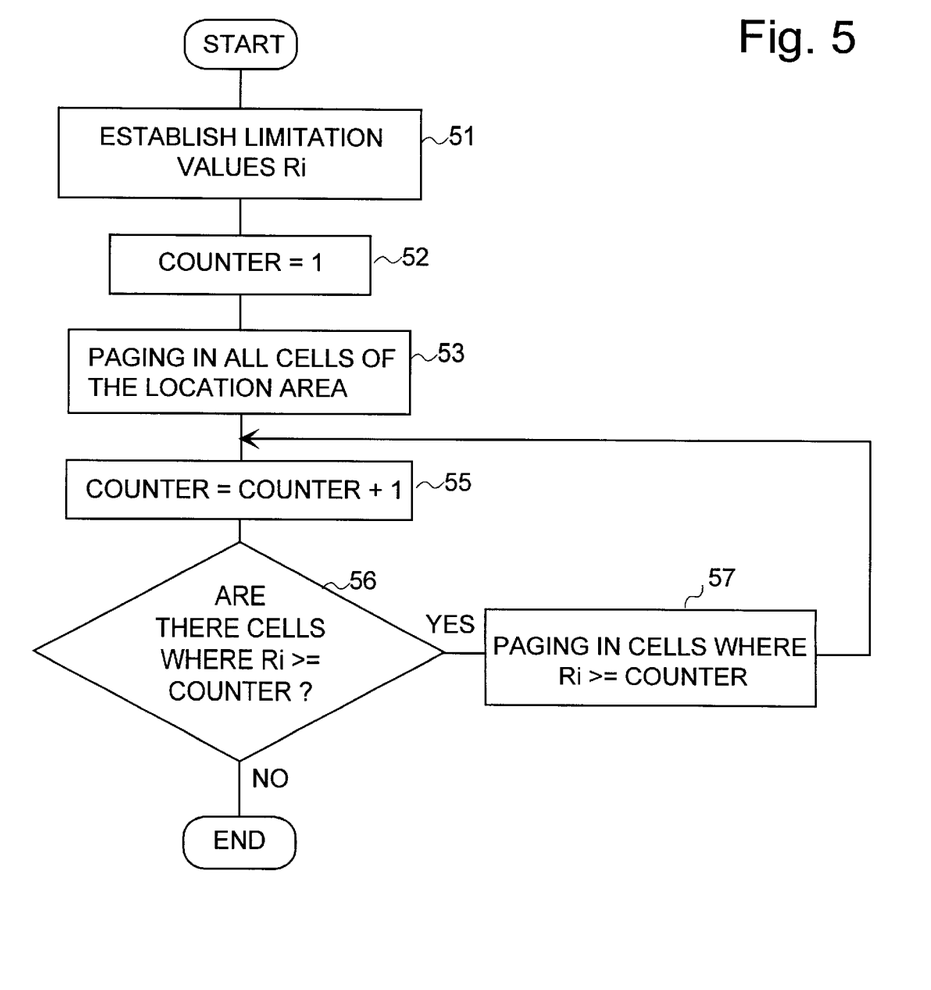
FIG. 5 shows a flow chart of the paging method according to a third embodiment of the invention.

FIG. 5 shows a flow chart of a third embodiment of the paging method according to the invention. In the third embodiment of the invention, the unit controlling the paging process in the mobile communications system, preferably a unit having several subordinated base transceiver stations, does not wait for a reply from mobile station MS, but completes the whole paging process whether the mobile station replies or not. At point 51 in FIG. 5 the operator establishes limitation values Ri for the number of pagings in the same way as described above in connection with the primary embodiment. At point 52 a value of 1 is set for the counter counting the number of pagings to be started. At point 53 state-of-the-art paging for mobile station MS is performed first in all cells of the location area indicated by the subscriber information, in the case of FIG. 2 in cells of location area LA10. At point 55 in FIG. 5 the counter value is increased by one according to the present invention. At point 56 the limitation values Ri established for the number of pagings are compared with the counter value, which according to the above description is 2 after the first paging, and a check is made to find out whether some of the limitation values for the number of pagings is at least equal to the counter value. In the same way as in the primary embodiment, when the condition at point 56 is fulfilled, a new paging is performed at point 57 in those cells, which have a limitation value Ri which is at least equal to the counter value. In the case shown in FIG. 2 this first re-paging according to point 57 is performed in cells C9 and C10, which have such limitation values R9=2 and R10=3 which are at least equal to the counter value of 2. Next, the process again proceeds to point 55 in FIG. 5 to increase the counter value once more by one. The next step is the check at point 56 as described above. If cells allowing paging are still found, re-paging at point 57 will be performed in those cells, in the case of FIG. 2 a second re-paging, that is, the third paging is performed in cell C10, having a R10=3 at least equal to the counter value of 3. Re-pagings are continued in cells allowing re-paging, until cells allowing re-paging are no longer found, that is, until the condition of the check at point 56 in FIG. 5 is no longer fulfilled, whereby the paging is regarded as completed. Further proceeding of a successful and an unsuccessful paging is in a state-of-the-art manner.

The unit controlling the paging process in a third embodiment of the invention is preferably a base station controller BSC, which does not interpret reply messages of the mobile station MS arriving from the base transceiver station BTS, but which only relays them to the mobile services switching centre MSC. Control in the third embodiment may in principle also be arranged from mobile services switching centre MSC, if the mobile services switching centre MSC does not use information on the reply arrived from mobile station MS for controlling the re-paging process.

The limitation values and counter operation presented above are arranged suitably in each operating environment so that the limitation values are used for limiting the number of pagings to be performed at the desired value. Thus, the counter can be set e.g. to count pagings already performed, whereby the limitation value check must be carried out e.g. so that the limitation values Ri for the number of pagings are established at the value for the allowed number of pagings, whereby re-pagings are in principle performed in each cell, until the number of pagings performed in the cell is equal to the limitation value Ri for the number of pagings in the cell. The counter may also be arranged to count otherwise than in steps of +1 described above.

With the aid of limitation value Ri for the number of pagings according to the invention the paging load of the network is reduced to a minimum, however, preserving a sufficient service level especially from the viewpoint of successful pagings. The establishment of limitation values Ri for the number of pagings may be arranged in several ways. The operator may establish the limitation values Ri he desires on a basis of different criteria. Some ways of establishing limitation values will be presented in the following.

Based on various parameters describing the operation of the radio network it is possible to predict the future behaviour of the network. For the paging method of the present invention it is possible to estimate the success of paging and re-paging, e.g. separately for each cell. For defining limitation values Ri those mobile station pagings $m_{1i}$ are registered e.g. in each cell over a certain period of time, to which the mobile station has replied after the first paging message was sent, and those pagings $m_{2i}$ are registered during the same period to which the mobile station has replied after the second paging message was sent. This information is advantageously obtained e.g. in the BSSMAP_COMPLETE_LAYER_3_INFORMATION message sent by the base station controller to the mobile services switching centre MSC, in which the mobile services switching centre MSC learns if the mobile station MS has replied to the paging and which also states through which base transceiver station the mobile station MS sent its reply. To compile representative statistics, the mobile communications system must be operated for some time so that at least one re-paging is sent in all cells, when the mobile station has not replied to the first paging, for the number $m_{2i}$ of pagings replied to in the second paging to be rational. In addition, a registration period of sufficient length will guarantee that enough replies to pagings are obtained, whereby statistics will better correspond with the reality. The relation of numbers of successful pagings $\alpha_i=m_{2i}/m_{1i}$ shows the probability of failure of paging in the individual cell and it may be used for optimising the number of re-pagings. If, for example, there has never been any reply to the second paging in some cell, it is very unlikely that any failure of pagings would be due to shadow areas of the radio coverage or to interference/noise in the area of the cell. Failure of paging is then more probably due to the circumstance that the mobile station MS unbeknownst to the mobile communications network has been turned off or to the circumstance that the transmission power of the mobile station MS is not sufficient for delivering a reply to base transceiver station BTS. The probability $a_i$ of failure of paging in the individual cell may thus be seen as describing the occurrence of shadows in the cell, so that the higher the $\alpha_i$ the larger is the total shadow area of the cell.

Re-paging in the area of a cell having a good radio coverage will most probably not have any result. Thus in cells, where the relation $\alpha_i$ calculated on a basis of statistical number values $m_{2i}$, $m_{1i}$ obtains a value of 0, paging of mobile stations is preferably performed e.g. only once. Correspondingly, on a basis of $\alpha_i$ values which may be obtained with different $m_{2i}$, $m_{1i}$ values it is possible to define a suitable number of re-pagings for each cell. Limitation values Ri for the number of pagings may be chosen e.g. on a basis of threshold values defined for the value $\alpha_i$, e.g. so that with the value $\alpha_i=0$ the limitation value Ri will allow one paging only, with values $0<\alpha_i\leq 0.3$ the limitation value will allow no more than two pagings, that is, a first paging and one re-paging, with values $0.3<\alpha_i\leq 0.6$ the limitation value is set to allow no more than three pagings, etc. The operator may define suitable threshold values experimentally or by modelling the network in a suitable manner.

A mathematical way of modelling is described in the following for defining limitation values Ri based on network parameters. Parameters occurring in the model are the probability of failure of paging in the individual cell $\alpha_i$ which was described above and the probability of failure of the call $p_0$, which is defined based on call setup statistics gathered from the network from a certain geographical area e.g. the location area by calculating the relation between the number of failed mobile terminated call setup attempts over a certain period of time and the number of all mobile terminated call setup attempts over the same period of time. The probability $p_0$ may also be defined as covering the whole network. From this probability of failure of a call $p_0$ it is possible with a formula (1) and by assuming even distribution to calculate the probability of failure of a paging in the individual cell $p_i$, that is, the probability of the mobile station MS being located in the area of cell i. The term N occurring in formula (1) is the number of cells in the examined location area.

$$p_i=(1-p_0)/N, \text{ wherein } i=1,\ldots,N \tag{1}$$

The probability of successful paging in the individual cell $p_i$ could also be defined e.g. by calculating how often there are replies from a cell to mobile terminated calls. The probability $p_i$ may also be defined for individual calls or subscribers.

If in optimising paging the only objective would be to minimise paging costs, that is, the paging load, it would not be worth while to page for the mobile station at all, as loading will then be less. However, this is not an acceptable alternative from the viewpoint of service quality. On the other hand, if the only objective would be an optimum service quality, it would be worth paging for the mobile station, until a reply is received. However, when optimising paging in practice both the mutually opposed objectives mentioned above must be taken into account. For comparing these incommensurable parameters in the model to be described herein, a certain penal parameter C is established for failure of paging which represents the value of loss of the call as commensurable with the value of loading of radio resources. By increasing penal parameter C it is possible to increase the limitation values Ri for the number of allowed pagings and vice versa. The same penal parameter C may be used in all location areas of the network, whereby the standard or quality of paging will be uniform all over the network. The penal parameter C may also be used for the individual area, call or subscriber, if it is desirable to offer the subscriber e.g. different levels of service in the network. In practice, the operator thus selects and establishes the penal parameter C so that with the paging method according to the invention such numbers of re-paging are achieved in some area which have been found empirically sensible, e.g. a suitable paging load is established in the network, whereupon the same value may also be used elsewhere in the network.

The following formulas (2)–(5) may be used for solving the optimum number $s_n$ of all pagings of the mobile station MS as well as limitation values for the number of pagings for individual cells. Using the optimum limitation value for the number of pagings in the individual cell the use of radio resources is minimised with the method according to the invention. Table 1 shows formulas (2)–(5) where for the sake of simplicity and by way of example calculation is performed for five cells only. The following values are used as initial values in the calculation: $p_0=0.05$, $\alpha_1=\alpha_2=\alpha_5=0$, $\alpha_3=0.01$, $\alpha_4=0.05$. In the first line k=1 values $p_i$ are calculated with formula (1). The function $f_n(p)$ in formula (2) is a model of the expected value of paging costs. In formulas (2) and (5) the occurring parameter n shows the level of precision of the calculation. By increasing the value of parameter n the precision in optimising may be improved. In Table 1 the expected value of paging costs is calculated by using approximation $f_2(p)$.

$$f_0(p)=C,$$

$$f_1(p) = \min\left\{C, \min_i[1 + (1-(1-\alpha_i)p_i)C]\right\}, \tag{2}$$

$$f_n(p) = \min\left\{C, \min_i[1 + (1-(1-\alpha_i)p_i)f_{n-1}(T_ip)]\right\},$$

wherein $n > 1$ and $$T_ip=[(T_ip)_0, (T_ip)_1, \ldots, (T_ip)_N]$$

$$(T_ip)_j=p_j/(1-(1-\alpha_i)p_i, \text{ when } j\neq i$$

$$\alpha_ip_i/(1-(1-\alpha_i)p_i, \text{ when } j=i \tag{3}$$

$$\alpha_i=m_{2i}/m_{1i} \tag{4}$$

$$s_n=\min\{k:f_n(p(k+1))=C\} \tag{5}$$

The optimum paging end point $s_n$ is defined with formula (5), wherein $p(k+1)=(p_{1,\,k+1},\ldots,p_{N,\,k+1})$ is defined as follows in the case of Table 1. Examining line k=1 in Table 1 calculation is done at each column $p_i$ of the figure $(1-\alpha_i)p_i$ and these figures are compared with one another. As the value of column $\delta^*_k$ the index i of that column $p_i$ is chosen, which will give the highest figure of the ones mentioned. If more than one column will give the same higher figure, any index of the columns in question may be chosen for column $\delta^*_k$. E.g. in Table 1 on line k=1 the highest numerical value is obtained in columns $p_1$, $p_2$ and $p_5$ and $\delta^*_1=1$ is chosen of these.

Next, updated location probabilities may be calculated using formula (3), wherein index j indicates the cell which the calculation concerns and index i indicates the cell $\delta^*_1$ mentioned above which gives the highest numerical value. The results are shown in Table 1 on line k=2. Next, $\delta^*_2$ can be calculated using the new probability values $p_i$ thus obtained, etc.

When probabilities p(k) of line k have been calculated, the optimum paging cost $f_2(p(k))$ may be calculated according to formula (2). According to formula (5), when the calculation reaches the situation $f_2(p(k))=C$ the conclusion is drawn that the optimum moment of ending, that is, the number of all pagings, is k−1. This shows that the optimum paging cost is equal to the penalty for stopping paging, that is, it is no longer worth while to continue the paging. Optimum limitation values Ri for the number of pagings for individual cells may now be formed by calculating the number of occurrences for each cell in column $\delta^*_k$ until the moment of ending k.

TABLE 1

| k | $p_1$ | $p_2$ | $p_3$ | $p_4$ | $p_5$ | $\delta^*_k$ | $f_2$ (p) |
|---|---|---|---|---|---|---|---|
| 1 | 0.19 | 0.19 | 0.19 | 0.19 | 0.19 | 1 | 622 |
| 2 | 0 | 0.235 | 0.235 | 0.235 | 0.235 | 2 | 533 |
| 3 | 0 | 0 | 0.306 | 0.306 | 0.306 | 5 | 392 |
| 4 | 0 | 0 | 0.442 | 0.442 | 0 | 3 | 144 |
| 5 | 0 | 0 | 7.85E−3 | 0.785 | 0 | 4 | 218 |
| 6 | 0 | 0 | 3.09E−2 | 0.155 | 0 | 4 | 824 |
| 7 | 0 | 0 | 3.63E−2 | 9.07E−3 | 0 | 3 | 957 |
| 8 | 0 | 0 | 3.76E−4 | 9.41E−3 | 0 | 4 | 992 |
| 9 | 0 | 0 | 3.8E−4 | 4.75E−4 | 0 | — | 1000 |

The value calculated for the expected value $f_2(p)$ of paging costs with the value 9 of the last line k in Table 1 is no longer less than the penal parameter C, so it is not worth while to perform any further paging of this line. Thus the optimum limitation values for the number of pagings which can be obtained based on the calculations in Table 1 are R1=R2=R5=1, R3=2 and R4=3, wherein the limitation values indicate that number of maximum pagings which may be performed in each cell. Based on the results of calculations shown in Table 1 limitation values Ri for the number of pagings are stored for individual cells or cell groups in the mobile communications system e.g. in connection with the unit in control of the paging operation, e.g. in the form shown in Table 2. In the case of the secondary embodiment of the invention described above, the limitation values Ri for the number of pagings are stored in connection with each base transceiver station BTS.

TABLE 2

| Location area | Cell identifier | Limitation value Ri for the number of pagings |
|---|---|---|
| LA10 | C1 | 1 |
|  | C2 | 1 |
|  | ... | ... |
|  | C10 | 3 |

For the limitation values Ri defined by the operator, values may be defined in advance and the values are stored in the network or new values may be defined dynamically during operation of the network based on new statistics gathered from the network. The limitation values Ri are preferably stored in connection with the unit controlling the paging process in the mobile communications system, e.g. the mobile services switching centre MSC or the base station controller BSC, as was described above in the primary and third embodiments of the invention. When required, the limitation values Ri may also be stored in base transceiver stations BTS, in accordance with the secondary embodiment of the invention which was described above. The values $m_{1i}$ and $m_{2i}$ needed for calculating the limitation values are preferably formed in the operation and maintenance centre OMC or in the mobile services switching centre MSC using for each ending call attempt such records formed in the mobile services switching centre MSC, wherein the identifier of that base transceiver station BTS is stored from which the mobile station MS has replied as well as the number of performed pagings and any other information. Calculation of the limiting values may preferably be performed in the same unit where the values $m_{1i}$ and $m_{2i}$ are formed. If the limitation values Ri are calculated in the operation and maintenance centre OMC, they will be transferred from that centre to the concerned units controlling re-paging, such as the mobile services switching centre MSC or the base station controller BSC, corresponding with the embodiments presented in the foregoing. Alternatively, calculation of the limitation values Ri may be performed independently in each re-paging control unit, in which case the values $m_{1i}$ and $m_{2i}$ needed in the calculation will again be transferred to the re-paging control units from the place where the values $m_{1i}$ and $m_{2i}$ have been formed, e.g. from the OMC. It is an explicit advantage of the latter alternative that the limitation values may then be calculated in the re-paging control unit separately for each call, if required.

The mobile communications system implementing paging functionality according to the invention includes storing means according to the invention, e.g. a register, for storing limitation values for the number of pagings and means for limiting re-pagings to be performed. The means for limiting re-pagings to be performed comprise calculating means, e.g. counters, for counting the number of pagings to be performed, comparing means for comparing the values of the calculating means with the limitation values Ri for the number of pagings in cells and means for relaying a re-paging command to some of the cells of the area according to the location information based on the result of the comparison made by the said comparing means. The mobile communications system also preferably comprises means for defining limitation values for the number of pagings in the cells.

The method according to the invention is excellently suitable for use both in connection with fixed and dynamic location areas and also in such pagings where the set of cells to be paged is formed on a subscriber basis or on a call basis utilising the location information of the mobile station.

The results of the calculation in the presented optimum paging alternative may be utilised in designing the capacity required for the paging channels of the radio network. In radio systems of the TDMA and FDMA type this could mean that e.g. in each cell an individual and only necessary share of radio resources would be allocated for the paging channels. In CDMA systems a lower network noise level would be achieved by optimising the paging channels.

Drawings and their related explanation are intended only to illustrate the inventive idea. The details of the paging method and mobile communications system according to the invention may vary within the scope of the claims. Although the invention has been described in the foregoing mainly in connection with the setting up of a speech connection, the invention may also be used for some other kind of mobile terminated radio connection, e.g. for delivering short messages.

What is claimed is:

1. A paging method in cellular radio system including several cells, mobile stations and a database storing information about a location area of a mobile station, wherein a first paging of a mobile station (MS) is performed within all cells of the area according to the stored location information, wherein the method comprises:

dividing a location area according to a cell division into at least two sub-areas, each one of which is formed of at least one cell, defining a limitation value for the number of pagings for each cell of each sub-area, wherein the limitation value is based upon radio coverage in a cell, and re-paging of the mobile station so that the number of re-pagings to be performed in each cell within the location area is limited based on the said limitation values setting the number of pagings for each cell.

2. Method as defined in claim 1, wherein the location area is divided according to the cell division into at least two sub-areas, each one of which is formed of one cell.

3. Method as defined in claim 1, wherein for performing re-paging of the mobile station re-paging is started in those cells of the location area where the limitation values for the number of pagings allow re-paging, and paging of the mobile station is interrupted when re-paging is not allowed in any cell of the location area.

4. Method as defined in claim 1, for performing re-paging of the mobile station wherein the number of performed pagings is calculated, said number of performed pagings is compared with the limitation values for the number of pagings of the cells and a paging message is sent to the mobile station (MS) in those cells of the location area where the limitation value for the number of pagings exceeds the number of performed pagings, until the limitation value for the number of pagings does not exceed the number of performed pagings in any cell.

5. Method as defined in claim 1, wherein cell specific limitation values for the number of pagings are defined based on statistics on successful pagings in the radio system.

6. Arrangement in a cellular radio system, including several cells, mobile stations and a database storing information about the location area of a mobile station, the location area comprising at least two cells, the arrangement comprising means for storing cell specific limitation values for the number of pagings in each cell of the location area, wherein the limitation value is based upon radio coverage in a cell, and means for limiting re-pagings to be performed according to said limitation values.

7. Arrangement as defined in claim 6, wherein the arrangement also includes means for defining limitation values for the number of pagings in the cells.

8. Arrangement as defined in claim 6, wherein the means for limiting re-pagings to be performed include calculating means for counting the number of pagings to be performed, comparing means for comparing the value of the calculating means with the limitation values for the number of pagings in the cells and means for relaying a re-paging command to the cells in the area according to the location information based on the result of the comparison by the said comparing means.

9. Arrangement as defined in claim 7, wherein the means for defining cell specific limitation values include means of keeping statistics for forming statistics on successful pagings in the radio system and means of choosing limitation values for the number of pagings based on the statistics formed by the said means of keeping statistics.

10. Arrangement as defined in claim 9 in a cellular radio system, which cellular radio system includes an operation and maintenance centre, wherein the said means of choosing limitation values for the number of pagings is located in the operation and maintenance centre.

11. Arrangement as defined in claim 6 in a cellular radio system, which cellular radio system includes at least one centre, having subordinated to itself at least one base station controller and several base transceiver stations, wherein at least a part of the arrangement is located in the centre.

12. Arrangement as defined claim 6 in a cellular radio system, which cellular radio system includes at least one centre, having subordinated to itself at least one base station controller and several base transceiver stations, wherein at least a part of the arrangement is located in the base station controller.

13. Arrangement as defined claim 6 in a cellular radio system, which cellular radio system includes at least one centre, having subordinated to itself at least one base station controller and several base transceiver stations, wherein at least a part of the arrangement is located in the base transceiver station.

* * * * *